United States Patent [19]

Chong

[11] Patent Number: 5,791,361
[45] Date of Patent: Aug. 11, 1998

[54] CAR COVER

[76] Inventor: Chan Yong Chong. 476-54, Mia-5-Dong, Tobong-Ku, Seoul, Rep. of Korea

[21] Appl. No.: 512,376

[22] Filed: Aug. 8, 1995

[30] Foreign Application Priority Data

Aug. 11, 1994 [KR] Rep. of Korea ............ 1994-20306

[51] Int. Cl.⁶ ............................................. B60J 11/00
[52] U.S. Cl. .................. 135/88.01; 296/136; 135/88.05; 135/88.07; 135/119; 135/120.4; 52/3
[58] Field of Search ......................... 296/136, 95.1; 52/3, 5; 135/88.01, 88.05, 88.07, 88.13, 88.14, 88.15, 93, 97, 120.4, 119

[56] References Cited

U.S. PATENT DOCUMENTS

| 2,358,446 | 9/1944 | Couse | 135/88.13 X |
| 2,666,840 | 1/1954 | Poirier | 135/119 X |
| 4,206,575 | 6/1980 | Leonard | 52/3 X |
| 4,265,261 | 5/1981 | Barker | 135/93 X |
| 4,657,298 | 4/1987 | Yong | 135/119 X |
| 4,925,234 | 5/1990 | Park et al. | 135/119 X |
| 5,209,545 | 5/1993 | Slaugh | 296/136 |
| 5,244,246 | 9/1993 | Cunningham | 296/136 |
| 5,429,406 | 7/1995 | Huang | 296/136 X |
| 5,435,362 | 7/1995 | Chiang | 296/136 X |
| 5,497,819 | 3/1996 | Chiang | 296/136 X |

FOREIGN PATENT DOCUMENTS 89-9171  12/1989  Rep. of Korea.

Primary Examiner—Wynn E. Wood
Attorney, Agent, or Firm—Ladas & Parry

[57] ABSTRACT

Herein is disclosed a car cover for placement over a roof, front and rear windows and two front and rear side window portions of a car. The cover is of such a makeup that it facilitates the entrance of drivers and the ventilation of the car. The cover can also be used as a simple tent.

21 Claims, 4 Drawing Sheets

CAR COVER

BACKGROUND OF THE INVENTION

This invention is related to providing a car cover for covering the roof and all windows of the car, and in particular, to providing a car cover for enabling the partial opening of the cover for entering into and ventilating the car.

PRIOR ART

Generally, a car is delivered together with a cover suitable thereto as an accessory. The cover prevents damage to the car from pollution, snow, rain, etc., as well as protects the car when not in use.

Covers manufactured are intended to cover the entire car. They are, therefore, not easy to install or remove and the entire cover must be taken off should one wish to enter the car.

In order to resolve the problems described above, various types of car covers are being developed. One type which covers only the windows and roof of the car is disclosed in Korean Utility Model Publication No. 89-9171.

This publication discloses a cover that is easy to position or remove from the car since it does not cover the entire car. It is also easy to store. Additionally, it can be used in protecting against temperature increases inside the car during hot seasons when cars are frequently exposed to the sun. But, the cover has its drawbacks. Some of these involve its partial removal for entrance into the car, its lack of ventilation, and its ability to be readily stolen since its connecting means are situated on the outside of the car.

Accordingly, the present invention is designed to attempt to resolve these problems as well as to provide for uses beyond that of a car cover.

A desire with this invention is to provide a car cover which: 1) can be wrapped over and detached from cars; and 2) enables users to freely enter and exit the car with the cover still in place; 3) assures ventilation; and 4) offers viewing capabilities.

It is also desired that the invention provide a car cover that shades light from the outdoors.

SUMMARY OF THE INVENTION

The invention comprises a cover having a roof portion, front and rear window portions and two front and rear side window portions. The cover further comprises cut portions between the front window portion and the two front side window portions and between the two front and rear side window portions. The cover further comprises absorbers connected by means of ropes or strings to the predetermined positions of the cut portions.

In another embodiment of the invention, there is a cover having a roof portion, front and rear window portions and two front and rear side window portions. This cover includes slide fasteners fixed between the front window portion and the two front side window portions and between the two front and rear side window portions. Also included is an edge portion having a predetermined thickness and diameter which is formed on the lower portion of the rear window portion; and Velcro™ tapes connected by means of strings to the edge portion.

BRIEF DESCRIPTION OF THE INVENTION

The invention will now be described in detail with reference to the accompanying drawings.

DETAILED DESCRIPTION OF THE INVENTION

Figure 1:
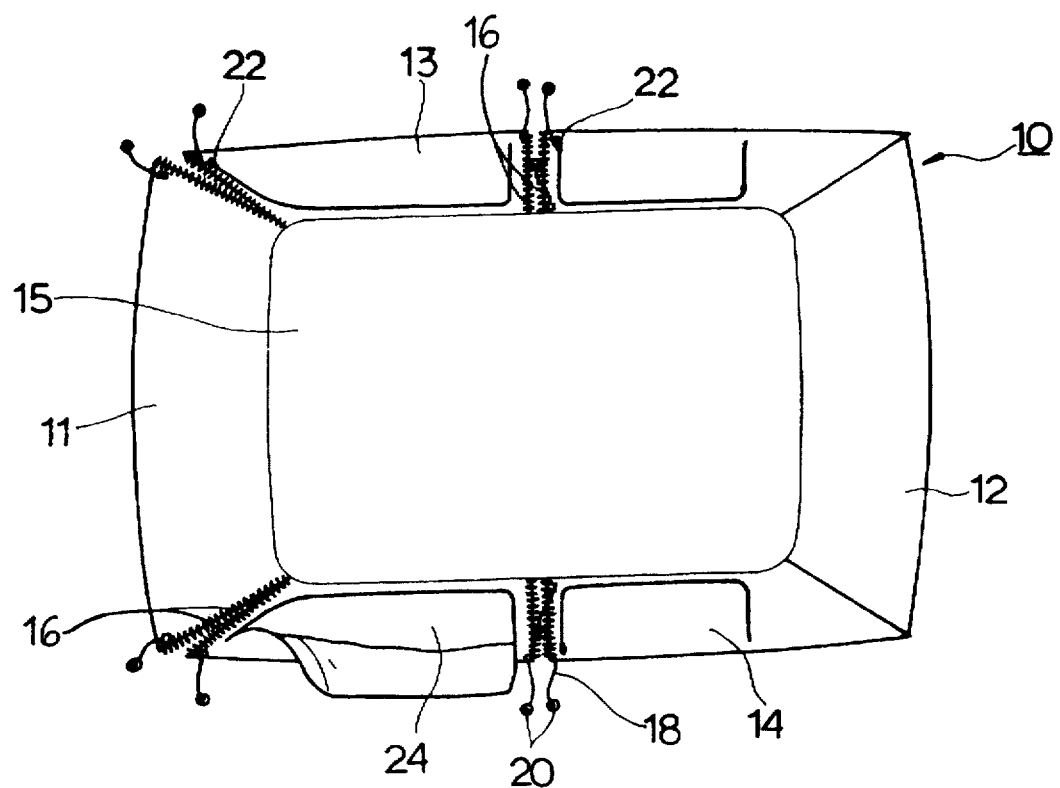
FIG. 1 is a plan view illustrating a car cover of a first embodiment of the invention.
Figure 2:
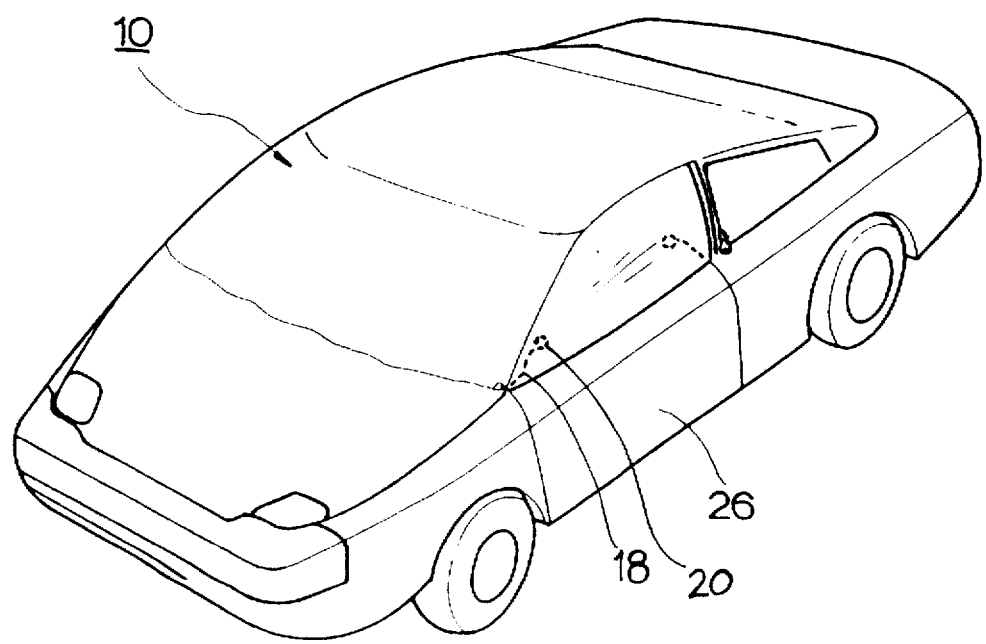
FIG. 2 is a perspective view illustrating the attachment of the cover of FIG. 1 on a car.

FIG. 1 is a plan view of a first embodiment of the invention. FIG. 2 is a perspective view showing the cover of FIG. 1 on a car.

From FIG. 1, cover 10 is seen to comprise front and rear window portions 11 and 12, front and rear side window portions 13 and 14 and a roof portion 15. The cover 10 also includes cut portions between the front window portion 11 and the two front side window portions 13 and between the two front and rear side window portions 13 and 14. Each of the two front side window portions 13, the two rear side window portions, and the front window portion 11 include fastening means or suction devices such as suction cups 20 mounted on the lower portion thereof. Each fastening means or suction device 20 is connected by means of strings or securement means 18 to the lower portion of the window portions. The two front and rear side window portions 13 and 14 each have a flap or portion 24 of a shape similar to the window portions. This portion 24 is provided with a fastener 22 to release or hold portion 24 open and closed respectively.

In use, the cover 10 is placed on the roof of a car. Its portions are then spread over the corresponding front and rear windows and the two front and rear side windows of the car. The front window portion 11 is then fixed to the car such that its suction cups or holding means 20 are attached to the inside of the front side windows with strings 18 having been pulled into the car. This is accomplished by the opening of the car door 26. The two front side window portions 13 are then placed in the car, and then their suction cups or holding means 20 are fixed on each of the two front side windows with the door 26 being closed. Similarly, the two rear side window portions 14 are attached on the inside portion of the two rear side windows by means of their suction cups or holding means 20 which are inserted in the car. Otherwise, the two rear side window portions 14 are fixed on the outside portion of the car with their suction cups or holding means 20 being attached to each inner portion of the two rear side windows.

As described above, the cover 10 includes cut portions between the front window portion 11 and the two front side window portions 13 and between the two front and rear side window portions 13 and 14 to enable the free entrance and exit from the car with the cover thereon. Movable fasteners 16 attached to front window portion 11 and the two front side window portions 13, and to the two front and rear side window portions 13 and 14 releasably connect front window portion 11 to the two front side window portions 13, and front side window portions 13 to rear side window portions 14. By operating movable fasteners 16, a user may disconnect side cover portions 13, 14 from adjacent cover portions 11, 13, 14, thereby also facilitating free entrance and exit from the car with the cover installed thereon. Further users in the car may use opening/closing portions 24 to see from the car. The front and rear window portions 11 and 12 may be folded back under the roof portion 15 and then attached on the roof by means of the suction cups or holding means. 20, so that the front and rear windows are left uncovered. The opening/closing portion 24 of the two front and rear side window portions 13 and 14 may be left open such as when traveling in the car for ventilation or view or even when the car is parked for similar reasons. They will merely flap down when released to leave open the window areas. Thus the cover may be used to cover the roof and all windows, the roof and selected windows, or the roof only. Further one can readily exit and enter the car without removing the cover. In fact, one may safely operate the car and later park it never having removed the cover. The cover 10 can also be used to carry an advertisement thereon.

Figure 3A:
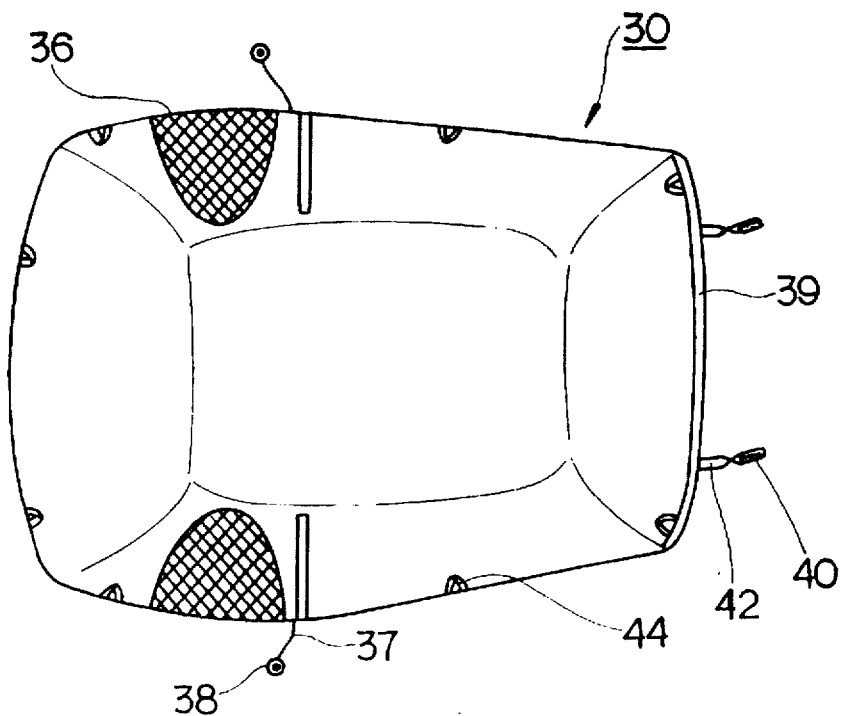
FIGS. 3A and 3B are respectively, a plan view and a bottom view of a car cover of a second embodiment according to the invention.
Figure 3B:
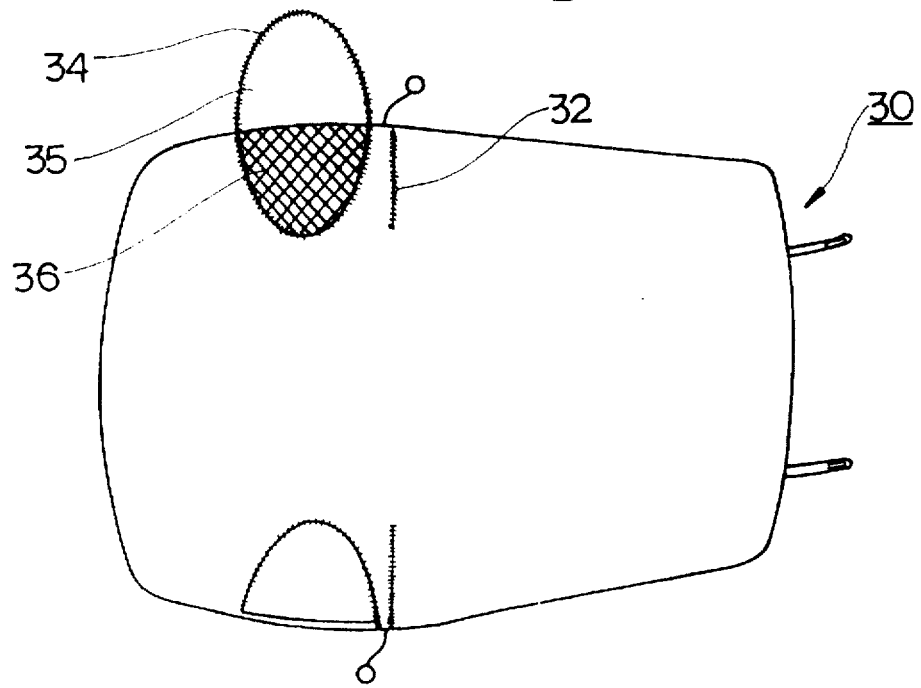
Figure 4:
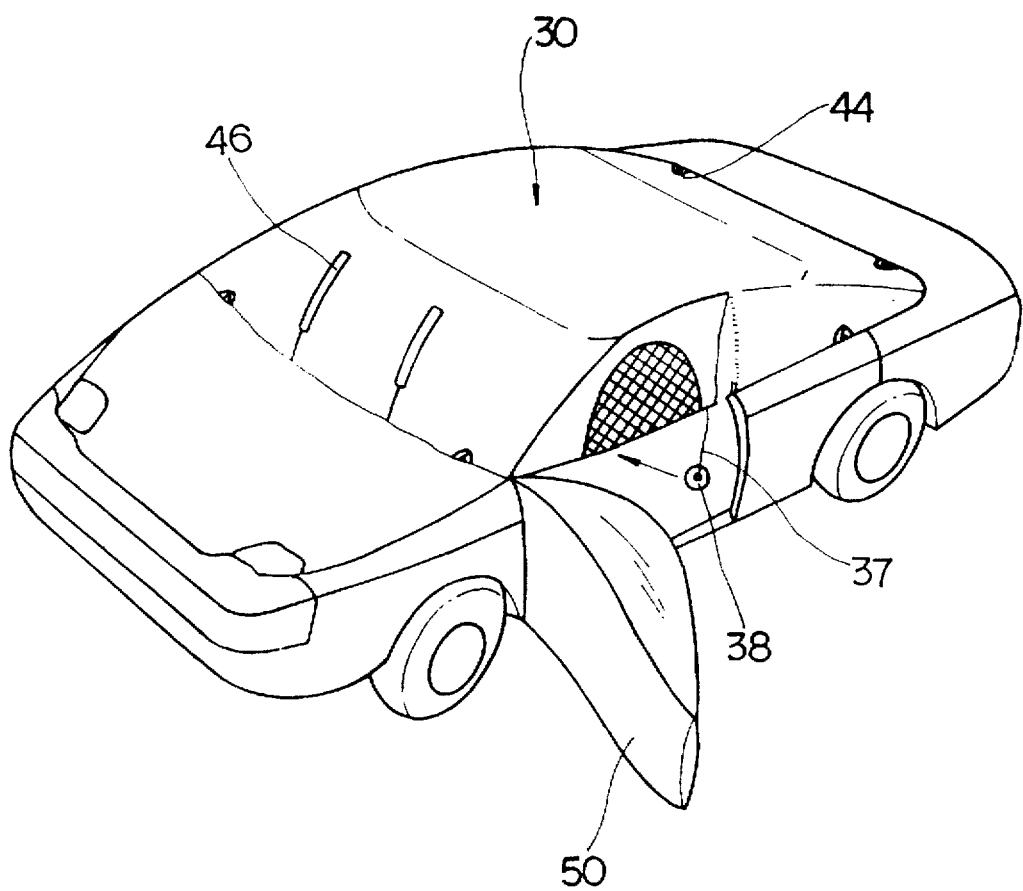
FIG. 4 is a perspective view illustrating the installation of the cover of the second embodiment of FIGS. 3A and 3B on a car.

A modification of the first embodiment is shown as a second embodiment in FIGS. 3A and 3B, which are respectively a plan view and a bottom view of a cover. FIG. 4 shows the cover on a car.

According to the second embodiment, a cover 30 has an integral member for covering the front and rear windows and the two front and rear side windows. A slide fastener 32 is mounted on a portion between the two front and rear side window portions and an opening flap 35 is formed on the front side window portions. Around the circumference of opening 35 is a slide fastener 34 mounted to open/close the opening flap 35 for the ventilation in a car. Opening flap 35 is shown provided with a moth-proof net 37 to prevent the entrance of moths, etc. in the car when the flap 35 is open. Flap 35, will merely flap down when released thereby making available on both sides of the cover the net 37. Suction cups or holding means 38 are connected by means of strings or attachment means 38 to the lower portions of the two front side window portions. An edge portion 39 is formed on the lower edge of the rear window portion. This portion 39 has a diameter and thickness, to which Velcro™ tapes 40 are fixed by means of straps 42. A predetermined number of rings 44 are mounted around the circumference of the cover 30 to enable the cover 30 to be used also as a tent. In this use, poles or strings are coupled in known fashion with each ring 44 to support the cover 30. Velcro™ tapes (not shown) are also mounted in the area of the trunk of the car to couple with the corresponding Velcro™ tapes 40.

In this second embodiment, use of the cover 30 over a car is shown in figure. 4. Coupling of the rear window portion to the trunk is shown in FIG. 5.

Figure 5:
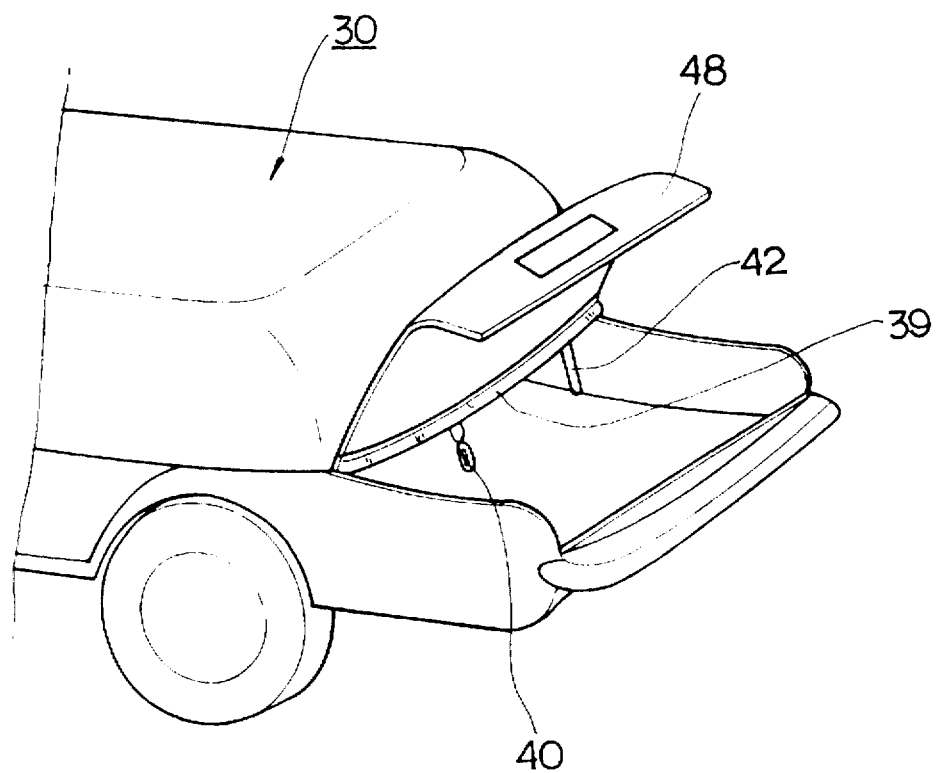
FIG. 5 is a view illustrating a method of coupling a rear window portion of the invention to a car.

As seen in FIGS. 4 and 5, the cover 30 is spread over the car roof, the front and rear windows and the two front and rear side windows. The cover's 30 front and rear portions are placed over the corresponding portions of the car with both front side doors and the trunk being opened. The front portion of the cover 30 is held against the front window by window wipers 46. These will help prevent the cover's 30 removal due to winds. The rear portion of cover 30 is positioned on the rear window such that Velcro™ tapes 40 are pulled to couple with other Velcro™ tapes in the area of the trunk after straps 42 are introduced between the clearance between the trunk door 48 and the car body into the trunk cavity. Then the trunk door 48 is closed with the edge portion being caught between the trunk door 48 and the car body. This holds the edge portion 39 in place against winds. The side window portions of the cover 30 are spread from the roof portion and inserted between the car body and side doors 50. Thus, the cover 30 is wrapped over and within the car according to the second embodiment.

The second embodiment allows a driver to enter the car by loosening fastener 32 after opening the door 50. For interior ventilation of the car, the slide fasteners 34 are moved after the side window is rolled down. The moth-proof net 36 remains in place acting to prevent insects from entering the car. The driver may also see through the opening portion 35 when the slide fastener 34 has been moved. Should one wish to remove the front side window portions, the fastening means or suction device 38 connected to the string 37, may be pulled up and attached on the inner front window to open the side front windows.

The cover may be made of various materials such as chemical fibers, vinyls, etc. and may be of a material to provide a base for color and printing. The cover may be made to permit the manufacturer to design desirous logos, commercial messages, drawings etc., on the various backgrounds of the cover, thereby allowing for advertisements as well as visual scenes. When using the cover as a tent or canopy, say in the field, the poles are fitted into the rings 44. These coupled with lengths of rope form in a known fashion, a simple shielding tent against the sun. Furthermore, the cover size is advantageous in that it is relatively small thereby facilitating the easy storage thereof.

What is claimed is:

1. A car cover for use with a car having a roof, a front window and a rear window each depending from the roof and located generally opposite each other, sides defined between the front and rear windows and associated with the roof, the sides defining doors with windows located near the roof, the front window and rear window and sides defining in part an inside of the car to which said doors with windows open, said car cover comprising:

a roof portion;

a front window portion and a rear window portion connected to said roof portion;

front and rear side portions connected to the roof portion and located between the front and rear window portions; and suction cups or holders connected to the cover;

wherein said roof portion, front window portion, and rear window portion are adapted to be placed over the roof, front window, and rear window of said car, respectively, and wherein defined between the front window portion and the front side portions and between the front side portions and the rear side portions are cut portions, the cut portions enabling the front side portions to be placed inside of the car, the suction cups or holders removably securing the car cover to the inside of the car.

2. The car cover as claimed in claim 1, wherein the cut portions enable the rear side portions to be placed inside the car.

3. The car cover as claimed in claim 1, further comprising:

first movable fasteners attached to the front window portion and the front side portions for removable connection of the front window portion to the front side portions;

second movable fasteners attached to the front side portions and the rear side portions for removable connection of the front side portions to the rear side portions.

4. A car cover comprising:

a roof portion having;

front and rear window portions connected to said roof portion;

two front and two rear side portions connected to said roof portion;

first movable fasteners attached to the front window portion and the front side portions for detachable connection of the front window portion to the front side portions; and second movable fasteners attached to the front side portions and the rear side portions for detachable connection of the front side portions to the rear side portions.

5. The car cover as claimed in claim 4, wherein the cover is made of chemical fibers providing free color application and easy printing of designs or logos thereon.

6. The car cover as claimed in claim 4, further having:

opening flaps formed in the front side portions; and third movable fasteners mounted on the flaps to at least partially secure the flaps to the front side portions; whereby the third movable fasteners may be released, permitting the opening flaps to be moved at least partially away from the front side portions to form an opening in the front side portions.

7. The car cover as claimed in claim 6, further comprising insect nets covering the openings in the front side portions of the cover.

8. The car cover as claimed in claim 4, further comprising:

an edge portion having a predetermined thickness and diameter, said edge portion being formed on a lower end portion of the rear window portion.

9. The car cover as claimed in claim 8, further comprising:

connecting straps affixed to the edge portion; and trunk straps having connectors for removable attachment to the connecting straps, wherein upon securing the trunk straps to the connecting straps, the trunk straps are secured within a trunk of a car on which the cover is placed to hold the cover against the car.

10. The car cover as claimed in claim 4, further comprising:

suction cups or holders connected to the front and rear window portions and to the front and rear side portions to removably secure the front and rear window portions and the front and rear side portions to the surface of a car.

11. A cover for a vehicle having a roof, sides connected to the roof, and an inside area defined by the roof and sides, the cover being comprised of:

a body, the body defining selected edge cuts therein;

fastening means associated with the body; and at least one portion defined by the selected edge cuts;

wherein the cover is adapted to be placed on the roof of the vehicle and draped over the sides of the vehicle, the at least one portion being placed in the inside area of the vehicle and secured within the inside area of the vehicle by the fastening means.

12. The cover of claim 11, wherein the at least one portion has a securable flap formed therein, and wherein the flap can be at least partially moved away from the at least one portion to define an opening in the at least one portion.

13. A car cover for use with a car having a roof, sides connected to the roof, the sides having windows, and an inside disposed by and between the roof and sides, the cover comprising:

1) a body, the body defining a plurality of edge cuts therein, the edge cuts defining:
   a) a roof portion;
   b) a front window portion;
   c) a rear portion including an edge portion formed on a lower end of said rear portion;

2) two front and two rear side portions, the rear side portions defining opening flaps therein;

3) suction cups or holders associated with the front window portion, rear window portion, and two front and two rear side portions;

4) movable fasteners attached to the front window portion and the two front side portions and to the front and rear side portions for detachable connection of the portions to each other, and attached to the opening flaps to connect the opening flaps to the side portions, such that by manipulating the movable fasteners on the opening flaps, the opening flaps may be moved at least partially away from the side portions to form an opening in the side portions; and 5) insect nets covering the openings in the front side portions of the cover;

wherein the cover is adapted to be placed on the roof of the car and draped over the sides of the car, the edge cuts enabling portions of the cover to be placed inside of the car or folded away from other portions of the cover, the suction cups or holders enabling one to secure the cover to the car.

14. A car cover comprising:

a roof portion;

a front window portion and a rear window portion connected to said roof portion;

front and rear side portions connected to the roof portion and located between the front and rear window portions; and suction cups or holders connected to the cover;

wherein defined between the front window portion and the front side portions and between the front side portions and the rear side portions are cut portions, the cut portions enabling the front side portions to be placed inside of a car, the suction cups or holders removably securing the car cover to the inside of the car.

15. The car cover as claimed in claim 14, wherein the cut portions enable the rear side portions to be placed inside the car.

16. The car cover as claimed in claim 14, further comprising:

first movable fasteners attached to the front window portion and the front side portions for removable connection of the front window portion to the front side portions;

second movable fasteners attached to the front side portions and the rear side portions for removable connection of the front side portions to the rear side portions.

17. The car cover as claimed in claim 14, wherein the cover is made of chemical fibers providing free color application and easy printing of designs or logos thereon.

18. The car cover as claimed in claim 14, further having:

opening flaps formed in the front side portions; and movable fasteners mounted on the flaps to at least partially secure the flaps to the front side portions; whereby the movable fasteners may be released, permitting the opening flaps to be moved at least partially away from the front side portions to form an opening in the front side portions.

19. The car cover as claimed in claim 18, further comprising insect nets covering the openings in the front side portions of the cover.

20. The car cover as claimed in claim 14 further comprising:

an edge portion having a predetermined thickness and diameter, said edge portion being formed on a lower end portion of the rear window portion.

21. The car cover as claimed in claim 20, further comprising:

connecting straps affixed to the edge portion; and trunk straps having connectors for removable attachment to the connecting straps, wherein upon securing the trunk straps to the connecting straps, the trunk straps are secured within a trunk of a car on which the cover is placed to hold the cover against the car.

* * * * *